United States Patent
Chen

(10) Patent No.: US 11,411,703 B2
(45) Date of Patent: Aug. 9, 2022

(54) SIGNAL TRANSMISSION AND DETECTION METHOD AND DEVICE

(71) Applicant: DATANG MOBILE COMMUNICATIONS EQUIPMENT CO., LTD., Beijing (CN)

(72) Inventor: Xianguo Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/424,893

(22) PCT Filed: Jan. 14, 2020

(86) PCT No.: PCT/CN2020/072093
§ 371 (c)(1),
(2) Date: Jul. 22, 2021

(87) PCT Pub. No.: WO2020/151535
PCT Pub. Date: Jul. 30, 2020

(65) Prior Publication Data
US 2022/0085941 A1    Mar. 17, 2022

(30) Foreign Application Priority Data
Jan. 22, 2019 (CN) .......................... 201910058146.4

(51) Int. Cl.
*H04W 72/04* (2009.01)
*H04L 5/00* (2006.01)
*H04L 1/00* (2006.01)

(52) U.S. Cl.
CPC .......... *H04L 5/0048* (2013.01); *H04L 1/0038* (2013.01); *H04W 72/042* (2013.01); *H04W 72/0446* (2013.01); *H04W 72/0453* (2013.01)

(58) Field of Classification Search
CPC ........... H04W 72/042; H04W 72/0446; H04W 72/0453; H04L 1/0038; H04L 1/0048; H04L 5/14; H04L 5/00
See application file for complete search history.

(56) References Cited

U.S. PATENT DOCUMENTS

2019/0349955 A1*  11/2019  Li ........................ H04L 5/0051
2020/0106589 A1*  4/2020   Xu .......................... H04J 13/16
(Continued)

FOREIGN PATENT DOCUMENTS

CN    101267611 A    9/2008
CN    102655652 A    9/2012
(Continued)

OTHER PUBLICATIONS

Zte et al.,"Discussion on Measurements and RS Design for CLI Mitigation", 3GPP TSG RAN WG1 Meeting #88bis, Spokane, Washington, USA, Apr. 3-7, 2017, total 11 pages, R1-1704434.
(Continued)

*Primary Examiner* — Chi Ho A Lee
(74) *Attorney, Agent, or Firm* — Kilpatrick Townsend & Stockton, LLP

(57) ABSTRACT

Disclosed are a method and a device for transmitting and detecting a signal. The method provided in the present application: includes determining time-frequency resource for sending a dedicated reference signal sequence; sending the dedicated reference signal sequence on the time-frequency resources; and identifying remote interference by detecting the dedicated reference signal sequence. The time-frequency resources include a time slot of a downlink radio frame in a time domain and a frequency sub-band obtained by dividing a maximum frequency bandwidth available to a base station in a frequency domain.

18 Claims, 4 Drawing Sheets

(56) References Cited

U.S. PATENT DOCUMENTS

| | | | | |
|---|---|---|---|---|
| 2020/0374874 A1* | 11/2020 | Ke | .................. | H04L 5/0048 |
| 2021/0185726 A1* | 6/2021 | Xu | .................. | H04W 88/14 |
| 2021/0235463 A1* | 7/2021 | Xu | .................. | H04J 11/0056 |
| 2021/0242994 A1* | 8/2021 | Bi | .................. | H04L 5/0048 |
| 2021/0306127 A1* | 9/2021 | Sundberg | ............. | H04L 5/0048 |
| 2021/0352509 A1* | 11/2021 | Sundberg | ............ | H04W 72/082 |
| 2021/0376981 A1* | 12/2021 | Shen | ................. | H04L 5/0007 |
| 2021/0400676 A1* | 12/2021 | Faxer | ................. | H04L 5/0048 |
| 2021/0410081 A1* | 12/2021 | Xu | .................. | H04J 11/0056 |
| 2022/0006552 A1* | 1/2022 | Ghozlan | ............. | H04J 13/0062 |

FOREIGN PATENT DOCUMENTS

| | | |
|---|---|---|
| CN | 107343292 A | 11/2017 |
| CN | 108243444 A | 7/2018 |
| CN | 108964856 A | 12/2018 |
| WO | 2014079052 A1 | 5/2014 |
| WO | 2017079052 A1 | 5/2017 |

OTHER PUBLICATIONS

CMCC, "Discussion on RS design for RIM", 3GPP TSG RAN WG1 Meeting #95, Spokane, USA, Nov. 12-16, 2018, total 17 pages, R1-1813899.

3GPP TR 38.866 V1.0.0, 3rd Generation Partnership Project; Technical Specification Group Radio Access Network; Study on remote interference management for NR(Release 16), total 32 pages, Nov. 2018.

* cited by examiner

SIGNAL TRANSMISSION AND DETECTION METHOD AND DEVICE

The present application is a national phase entry under 35 U.S.C. § 371 of International Application No. PCT/CN2020/072093, filed on Jan. 14, 2020, which claims the priority from Chinese Patent Application No. 201910058146.4, filed on Jan. 22, 2019, in the China National Intellectual Property Administration, and entitled "Signal Transmission and Detection Method and Device", which is hereby incorporated by reference in its entirety.

FIELD

The present application relates to the field of communication technologies, and particularly to a signal transmission and detection method and device.

BACKGROUND

Under meteorological conditions, there is a layer where the temperature inversion or the water vapor decreases sharply with height in the atmospheric troposphere. In this layer, the radio waves form the super-refraction propagation, the propagation loss is very small, and the ultra-long distance propagation can be achieved. Most of the radio wave radiation is limited in this layer, and similar to the propagation in a waveguide, this phenomenon is called the atmospheric waveguide propagation of electromagnetic waves. When the atmospheric waveguide occurs in a Time Division Duplexing (TDD) wireless network, the downlink signal of a remote base station still has the high strength after being transmitted over an ultra-long distance of tens or hundreds of kilometers, and the signal propagation delay exceeds the Guard Period (GP) length of uplink time slots which affects an uplink sub-frame of a near-end base station, causing the serious uplink interference. Such interference is called far-end interference or atmospheric waveguide interference.

The far-end interference is widespread in the TDD wireless network and has a very bad impact on the performance of the existing network. For the current Time Division Long Term Evolution (TD-LTE) existing network, the existing implementation solution is to detect the far-end interference by transmitting a dedicated feature sequence, where there is a need to detect the ID of the base station as the interference source. Therefore, the base station side needs to perform a large number of blind detections, the complexity of the detection algorithm is too high, the detection period is very long, and the detection results are not in real time, affecting the effectiveness of interference avoidance. At the same time, since the feature sequence occupies the full bandwidth, the base station must detect the feature sequence within the full bandwidth. This requires that the central frequency points and bandwidths of the interfered station and interfering station must be exactly the same in order to detect the feature sequence. However, the networking scenes of the existing network are complicated, and many scenes may not meet this requirement, which brings great limitation to the application of the scheme.

SUMMARY

The present application provides a method and device for transmitting and detecting a signal to solve the problems in the prior art that the remote interference detection algorithm has the high complexity, the detection is not in real time, and the central frequency points and bandwidths of the interfered station and interfering station must be exactly the same.

A method for transmitting a signal provided by an embodiment of the present application includes:

determining time-frequency resources for sending a dedicated reference signal sequence, and the time-frequency resources include a special time slot of a downlink radio frame in the time domain and a frequency sub-band obtained by dividing a maximum frequency bandwidth available to a base station in a frequency domain;

sending the dedicated reference signal sequence on the time-frequency resources; and identifying remote interference by detecting the dedicated reference signal sequence.

In the case when the base station determines that it needs to send a dedicated reference signal sequence (not limited to whether the suspected remote interference is detected), the dedicated reference signal sequence is sent through a method for transmitting a signal provided by the present application.

Since the atmospheric waveguide propagation delay is random, the symbols in the detection window of the receiving end are generally not aligned with the symbols of the received reference signal in the time domain. The method for transmitting a signal provided by the embodiments of the present application can ensure that the receiving end can detect the complete reference signal symbols no matter how the propagation delay changes, ensuring the detection performance.

In one embodiment, the dedicated reference signal sequence is sent in the special time slot of the downlink radio frame determined based on a base station ID.

The base station sends a dedicated reference signal, at a set period, and on the set time slot and symbol of the radio frame related to the base station ID, and the reference signal sequence can be a Gold sequence, ZC (Zadoff-Chu) sequence or other pseudo-random sequence.

In one embodiment, the radio frame is determined by at least one of following two schemes:

Scheme I: querying a mapping table between the base station ID and a system frame number of the downlink radio frame where the dedicated reference signal sequence is located, and determining the system frame number of the radio frame according to the base station ID:

$$n_{SFN} = \text{map\_table}(n_{NBID});$$

Scheme II: calculating and determining a system frame number of the downlink radio frame according to a formula of:

$$n_{SFN} = n_{NBID} \bmod (N_{SFN}^{max}+1);$$

and $n_{SFN}$ represents the system frame number of the downlink radio frame, $n_{NBID}$ represents the base station ID, $N_{SFN}^{max}$ represents a maximum value of the system frame number, and map_table represents the mapping table between the base station ID and the system frame number of the downlink radio frame where the dedicated reference signal sequence is located.

The method for determining the radio frame provided by the present application can ensure that different base stations send reference signals on different radio frames as much as possible, and avoid the higher false detection rate and missed detection rate due to the non-aligned superposition of the same reference signal on the same symbol at the receiving end, improving the detection performance.

In addition, Scheme II is simple to implement, and Scheme I can customize the mapping table between the base station ID and the system frame number of the radio frame where the reference signal is sent, or design a specific mapping formula, according to the occurrence area range of the remote interference of the existing network. The scheme is flexible and can be fully ensure that different base stations send reference signals on different radio frames.

In one embodiment, the dedicated reference signal sequence is sent during a downlink and uplink switching period, configured by an OAM, in the downlink radio frame, and a time interval of dedicated reference signal sequences sent twice adjacently meet the maximum propagation distance requirement of the remote interference.

In one embodiment, the dedicated reference signal sequence is located, after a downlink symbol and before a Guard Period (GP), of the special time slot.

In one embodiment, the dedicated reference signal sequence occupies two consecutive Orthogonal Frequency Division Multiplexing (OFDM) symbols in the time domain, and dedicated reference signal sequences on the two OFDM symbols are identical, and a Common Prefix (CP) is respectively provided in front of a first OFDM symbol and in back of a second OFDM symbol.

Since the atmospheric waveguide propagation delay is random, the symbols in the detection window of the receiving end are generally not aligned with the symbols of the received reference signal in the time domain. The time domain format of the reference signal provided by the present application can ensure that the receiving end can detect the complete reference signal symbols no matter how the propagation delay changes, ensuring the detection performance.

In one embodiment, a downlink and uplink switching period during which the base station sends the dedicated reference signal sequence is configured by an Operation, Administration and Maintenance (OAM), and the downlink and uplink switching period of the dedicated reference signal sequence is configured to be identical to a system frame period.

In one embodiment, the dedicated reference signal sequence sent by the base station must be one of all dedicated reference signal sequences configured by an OAM, and all the dedicated reference signal sequences configured by the OAM are reference signal sequences available to all base stations within a network range managed by the OAM.

In one embodiment, the OAM configures one or more dedicated reference signal sequences, and the base station selects, based on a base station ID, a dedicated reference signal sequence from all the dedicated reference signal sequences configured by the OAM as the reference signal sequence sent by the base station.

In one embodiment, when one or more reference signal sequences configured by the OAM are a full set of reference signal sequences, a decimal value of a fixed bit segment of the base station ID is determined as an ID of the dedicated reference signal sequence sent by the base station, or the ID of the dedicated reference signal sequence sent by the base station is determined according to a mapping table between the decimal value of the fixed bit segment of the base station ID and the ID of the dedicated reference signal sequence; when the one or more reference signal sequences configured by the OAM are a subset of the full set of reference signal sequences, the ID of the dedicated reference signal sequence sent by the base station is determined according to the mapping table between the decimal value of the fixed bit segment of the base station ID and the ID of the dedicated reference signal sequence.

In one embodiment, the fixed bit segment of the base station ID is determined based on a preset rule according to a quantity of the one or more dedicated reference signal sequences configured by the OAM and a quantity of radio frames during a downlink and uplink switching period of the one or more dedicated reference signal sequences.

In one embodiment, the location range of the fixed bit segment of the base station ID can be determined by the formula of:

$$[\lceil \log_2 N_{SFN}^{max} \rceil + 1, \lceil \log_2 N_{SFN}^{max} \rceil + \lceil \log_2 N_{RS} \rceil]$$

where $N_{SFN}^{max}$ represents the maximum number of radio frames during the transmission period of dedicated reference signals configured by the OAM, and $N_{RS}$ represents the number of dedicated reference signal sequences included in the range configured by the OAM.

If the scale of the remote interference is small, all base stations can be configured to send a fixed reference signal sequence, so that the base stations do not need to blindly detect multiple reference signal sequences, which can greatly reduce the complexity of the detection algorithm. If the scale of the remote interference is large, since the maximum value of the base station ID is generally much greater than the system frame period value, the probability of superposition of the same reference signal on the same symbol at the receiving end is relatively high, which will cause the higher false detection rate or missed detection rate. In this case, the OAM configures multiple reference signal sequences for all base stations to use. All reference signal sequences available to the system constitute a full set of reference signal sequences, these reference signal sequences must have the good auto-correlation and cross-correlation, and the reference signal sequences configured by the OAM may be a subset of the full set of reference signal sequences or may be the full set. Which reference signal sequence each base station uses is determined by the base station ID.

In one embodiment, the frequency sub-band is obtained by continuously dividing the maximum frequency bandwidth available to the base station according to a frequency sub-band size uniformly configured by an OAM, one dedicated reference signal sequence is sent on one frequency sub-band resource in the frequency domain, and dedicated reference signal sequences sent, by a same base station, on different frequency sub-bands are identical.

The frequency and bandwidth ranges available to base stations are generally large under 5G, and the near-end base station and far-end base station may use different frequency ranges and bandwidths. In order to support the mutual detections of reference signals between base stations that have different frequency points but overlapping frequencies, the same dedicated reference signal sequence is sent on each frequency sub-band in the frequency domain in the present application, where the frequency sub-band is obtained by dividing the maximum frequency bandwidth available to the local base station according to the frequency sub-band size uniformly configured by the OAM.

If the frequency points of the near-end base station and the far-end base station are staggered but the frequencies overlap partially, the base station needs to blindly detect the reference signal on each frequency sub-band within the full bandwidth range of the base station when detecting the reference signal. In the application scenarios of frequency sub-bands provided by the present application, the reference signals can be detected each other even if the frequencies of the base stations at both ends do not completely overlap, supporting the far-end interference detection between base stations with different frequency points and different bandwidths.

In one embodiment, sizes of respective frequency sub-bands in a same frequency band are identical, and sizes of respective frequency sub-bands in different frequency bands are identical or different; when a bandwidth size of a frequency band divided by the base station is smaller than the sizes of respective frequency sub-bands, the frequency band is not used as a frequency sub-band, and no dedicated reference signal sequence is sent on the frequency band.

Correspondingly, an embodiment of the present application provides a method for detecting a signal, including:

determining that a dedicated reference signal needs to be sent based on remote interference characteristics;

detecting a dedicated reference signal sequence sent by an opposite end on a special time slot; and determining whether remote interference exists according to the dedicated reference signal sequence.

In one embodiment, when the dedicated reference signal is determined to be needed to be sent based on the remote interference characteristics within first preset time, or when a quantity of times the dedicated reference signal sequence is detected is greater than N1 within the first preset time, then the dedicated reference signal sequence is sent;

when the quantity of times the dedicated reference signal sequence is detected within second preset time is greater than N2 (N2>N1), then it is determined that the remote interference exists;

when the quantity of times the dedicated reference signal sequence is detected within third preset time is less than N3 (N3<N2), then it is determined that no remote interference exists.

An embodiment of the present application provides a device for transmitting a signal, which includes:

a determining device configured to determine time-frequency resources for sending a dedicated reference signal sequence, where the time-frequency resources include:

a special time slot of a downlink radio frame in a time domain and a frequency sub-band obtained by dividing a maximum frequency bandwidth available to a base station in a frequency domain;

a sending device configured to send the dedicated reference signal sequence on the time-frequency resources;

identify remote interference by detecting the dedicated reference signal sequence.

In one embodiment, the dedicated reference signal sequence is sent in a special time slot of the downlink radio frame determined based on a base station ID.

In one embodiment, the downlink radio frame is determined by at least one of following two schemes:

Scheme I: querying a mapping table between the base station ID and a system frame number of the downlink radio frame where the dedicated reference signal sequence is located, and determining the system frame number of the downlink radio frame according to the base station ID:

$n_{SFN} = \text{map\_table}(n_{NBID})$;

Scheme II: calculating and determining a system frame number of the downlink radio frame according to a formula of:

$n_{SFN} = n_{NBID} \bmod (N_{SFN}^{max}+1)$;

where $n_{SFN}$ represents the system frame number of the downlink radio frame, $n_{NBID}$ represents the base station ID, $N_{SFN}^{max}$ represents a maximum value of the system frame number, and map_table represents the mapping table between the base station ID and the system frame number of the downlink radio frame where the dedicated reference signal sequence is located.

In one embodiment, the dedicated reference signal sequence is sent during a downlink and uplink switching period, configured by an OAM, in the downlink radio frame, and a time interval of dedicated reference signal sequences sent twice adjacently meet a maximum propagation distance requirement of the remote interference.

In one embodiment, the dedicated reference signal sequence is located, after a downlink symbol and before a Guard Period (GP), of the special time slot.

In one embodiment, the dedicated reference signal sequence occupies two consecutive OFDM symbols in the time domain, and dedicated reference signal sequences on the two OFDM symbols are identical, where a CP is respectively provided in front of a first OFDM symbol and in back of a second OFDM symbol.

In one embodiment, a downlink and uplink switching period during which the base station sends the dedicated reference signal sequence is configured by an OAM, and the downlink and uplink switching period is configured to be identical to a system frame period.

In one embodiment, the dedicated reference signal sequence sent by the base station must be one of all dedicated reference signal sequences configured by an OAM, and all the dedicated reference signal sequences configured by the OAM are reference signal sequences available to all base stations within a network range managed by the OAM.

In one embodiment, the OAM configures one or more dedicated reference signal sequences, and a base station selects, based on a base station ID, a dedicated reference signal sequence from all the dedicated reference signal sequences configured by the OAM as the reference signal sequence sent by the base station.

In one embodiment, when the one or more reference signal sequences configured by the OAM are a full set of reference signal sequences, a decimal value of a fixed bit segment of the base station ID is determined as an ID of the sent dedicated reference signal sequence, or the ID of the sent dedicated reference signal sequence is determined according to a mapping table between the decimal value of the fixed bit segment of the base station ID and the ID of the dedicated reference signal sequence; when the one or more reference signal sequences configured by the OAM are a subset of the full set of reference signal sequences, the ID of the sent dedicated reference signal sequence is determined according to the mapping table between the decimal value of the fixed bit segment of the base station ID and the ID of the dedicated reference signal sequence.

In one embodiment, the fixed bit segment of the base station ID is determined based on a preset rule according to a quantity of the one or more dedicated reference signal sequences configured by the OAM and a quantity of radio frames during a downlink and uplink switching period of the one or more dedicated reference signal sequences.

In one embodiment, the frequency sub-band is obtained by continuously dividing the maximum frequency bandwidth available to the base station according to a frequency sub-band size uniformly configured by an OAM, one dedicated reference signal sequence is sent on one frequency sub-band resource in the frequency domain, and dedicated reference signal sequences sent, by a same base station, on different frequency sub-bands are identical.

In one embodiment, sizes of respective frequency sub-bands in a same frequency band are identical, and sizes of respective frequency sub-bands in different frequency bands are identical or different; when a bandwidth size of a frequency band divided by the base station is smaller than the sizes of respective frequency sub-bands, the frequency band is not used as a frequency sub-band, and no dedicated reference signal sequence is sent on the frequency band.

Correspondingly, an embodiment of the present application provides a device for detecting a signal, including:

a first device configured to determine that a dedicated reference signal needs to be sent based on remote interference characteristics;

a second device configured to detect a dedicated reference signal sequence sent by an opposite end on a special time slot;

a third device configured to determine whether remote interference exists according to the dedicated reference signal sequence.

In one embodiment, when the dedicated reference signal is determined to be needed to be sent based on the remote interference characteristics within first preset time, or when a quantity of times the dedicated reference signal sequence is detected is greater than N1 within the first preset time, then the dedicated reference signal sequence is sent;

when the quantity of times the dedicated reference signal sequence is detected within the second preset time is greater than N2 (N2>N1), then it is determined that the remote interference exists;

when the quantity of times the dedicated reference signal sequence is detected within the third preset time is less than N3 (N3<N2), then it is determined that no remote interference exists.

To sum up, after the base station of the present application detects the suspected remote interference based on the remote interference characteristics, the base station sends the dedicated reference signal sequence on the specific radio frame. After detecting the dedicated reference signal sequence, the base station determines that it detects the remote interference based on the reciprocity of the remote interference.

For the dedicated reference signal, the present application provides a solution for the time-frequency domain format of the reference signal as well as the position, time and period of sending the reference signal, which can significantly reduce the complexity of the detection algorithm and reduce the false detection rate and missed detection rate, and can support the mutual detection of remote interference between base stations with different frequency points and different bandwidths.

For the remote interference detection, the present application provides a remote interference detection mechanism and detection algorithm based on reference signals.

Another embodiment of the present application provides a computing device, which includes a memory and a processor, where the memory is configured to store the program instructions, and the processor is configured to invoke the program instructions stored in the memory and perform any one of the above-mentioned methods in accordance with the obtained program.

Another embodiment of the present application provides a computer storage medium storing the computer executable instructions which are configured to cause the computer to perform any one of the above-mentioned methods.

BRIEF DESCRIPTION OF THE DRAWINGS

In order to illustrate the embodiments of the present application more clearly, the accompanying figures which need to be used in describing the embodiments will be introduced below briefly.

DETAILED DESCRIPTION OF THE EMBODIMENTS

Figure 1:
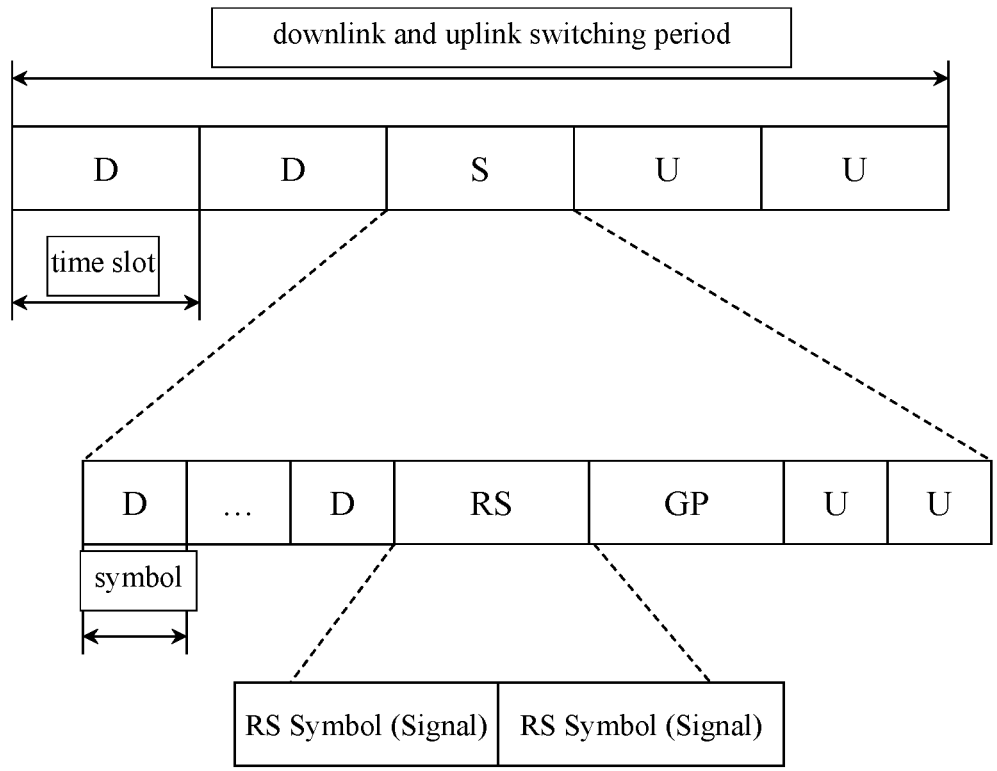
FIG. 1 is a schematic diagram of the position of a reference signal on a radio frame provided by an embodiment of the present application.

The described embodiments are a part of the embodiments of the disclosure but not all the embodiments. Based upon the embodiments of the disclosure, all of other embodiments obtained by those ordinary skilled in the art without creative work pertain to the protection scope of the disclosure.

The embodiments of the present application provide a method and device for transmitting and detecting a signal, to solve the problems in the prior art that the remote interference detection algorithm has the high complexity, the detection is not in real time, and the central frequency points and bandwidths of the interfered station and interfering station must be exactly the same.

Here, the method and device are based on the same application concept. Since the principle of solving the problem in the method is similar to that in the device, the implementations of the device and method can refer to each other, and the repeated description thereof will be omitted.

The embodiments of the present application may be applicable to various systems, especially 5G systems. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide interoperability for Microwave Access (WiMAX) system, 5G system and 5G NR system, etc. These systems all include terminal devices and network devices.

The terminal device involved in the embodiments of the present application may be a device for providing the voice and/or data connectivity to the user, a handheld device with the wireless connection function, or other processing device connected to the wireless modem. In different systems, the terminal device may have different names. For example, in a 5G system, the terminal device may be referred to as User Equipment (UE). The wireless terminal device can communicate with one or more core networks via the RAN, and the wireless terminal device can be a mobile terminal, such as a mobile telephone (or called "cellular" telephone), and a computer with the mobile terminal, for example, can be a portable, pocket, handheld, computer built-in or vehicle-carried mobile device, and they exchange the voice and/or data with the radio access network. For example, the wireless terminal device can be a Personal Communication Service (PCS) telephone, cordless telephone, Session Initiation Protocol (SIP) telephone, Wireless Local Loop (WLL) station, Personal Digital Assistant (PDA) and other devices. The wireless terminal device can also be called system, subscriber device, subscriber station, mobile station, mobile, remote station, access point, remote terminal, access terminal, user terminal, user agent, user device, which is not limited in the embodiments of the present application.

The network device involved in the embodiments of the present application may be a base station, which may include cells. Depending on specific application scenarios, the base station may also be called access point, or may refer to the device in the access network communicating with the wireless terminal via one or more sectors over the air interface or other names. The network device may be used to perform the inter-conversion between the received air frame and Internet Protocol (IP) packet, and used as the router between the wireless terminal device and the rest of the access network, where the rest of the access network may include IP networks. The network device can further coordinate the attribute management of the air interface. For example, the network device involved in the embodiments of the present application can be a network device (Base Transceiver Station (BTS)) in the Global System of Mobile communication (GSM) or Code Division Multiple Access (CDMA), or can be a network device (NodeB) in the Wideband Code Division Multiple Access (WCDMA), or can be an evolutional network device (evolutional Node B (eNB or e-NodeB)) in the Long Term Evolution (LTE) system, a 5G base station in the 5G network architecture (next generation system), or can be a Home evolved Node B (HeNB), a relay node, femto, pico, etc., which is not limited in the embodiments of the present application.

The embodiments of the present application will be described below in detail with reference to the drawings of the specification. It should be noted that the showing order of the embodiments of the present application only represents the sequential order of the embodiments, but does not represent the pros and cons of the embodiments.

Prior art has the following problems:

the base station needs to perform a large number of blind detections for each symbol and each feature sequence in the detection window, and the detection algorithm has too high complexity and consumes a lot of resources of the base station equipment;

the base station needs to detect and identify all remote interference sources, which leads to too long detection period, and it is unable to detect in real time, which affects the timeliness of interference avoidance;

since the feature sequence occupies the full bandwidth, the base station must detect the feature sequence within the full bandwidth. This requires that the central frequency points and bandwidths of the interfered station and interfering station must be exactly the same in order to detect the feature sequence and perform the interference avoidance, which greatly limits the application scenarios of the scheme.

Based on the above-mentioned problems in the prior art, the present application provides a method and device for transmitting and detecting a signal. The specific implementations refer to the following embodiments.

1. The transmission of the reference signal sequence.

The base station sends a dedicated reference signal sequence at a set period on the set time slot and symbol of the radio frame related to the base station ID, and the reference signal sequence can be a Gold sequence, ZC (Zadoff-Chu) sequence or other pseudo-random sequence.

The system frame number of the radio frame in which the base station sends the reference signal sequence is determined by the base station ID, and may be determined by one of two following schemes.

First scheme: calculating the system frame number of the radio frame by using a formula.

The frame number of the radio frame in which the base station sends the reference signal sequence is determined by the base station ID, and is calculated by the formula of:

$$n_{SFN}=n_{NBID} \bmod(N_{SFN}^{max}+1);$$

where $n_{SFN}$ represents the frame number of the radio frame in which the reference signal is sent, $N_{SFN}^{max}$ represents the maximum value of system frame number, and $n_{NBID}$ represents the base station ID (used to uniquely identify a base station).

Second scheme: obtaining the system frame number of the radio frame by using the mapping mechanism.

The frame number of the radio frame in which the base station sends the reference signal sequence can also be obtained by the formula of:

$$n_{SFN}=\text{map\_table}(n_{NBID});$$

where $n_{SFN}$ represents the frame number of the radio frame in which the reference signal is sent, $n_{NBID}$ represents the base station ID (used to uniquely identify a base station), and map_table is the mapping table or specific mapping formula between the base station ID and the system frame number of the radio frame in which the reference signal is sent.

The purpose of two above schemes is to ensure that different base stations send reference signals on different radio frames as much as possible, and avoid the higher false detection rate due to the non-aligned superposition of the same reference signal on the same symbol at the receiving end, improving the detection performance. The first scheme is simple to implement but can only ensure that the base stations with different lower $\lceil \log_2^{N_{SFN}^{max}} \rceil$ bits of base station IDs send reference signals on different radio frames, and otherwise, the non-aligned superposition of the same reference signal may occur at the receiving end. The second scheme can customize the mapping table, or design a specific mapping formula, between the base station ID and the system frame number of the radio frame in which the reference signal is sent, according to the occurrence area range of the remote interference of the existing network, which is more flexible, and can be fully ensure that different base stations send reference signals on different radio frames. However, the mapping table is too large, has the large overhead of resources of the base station and requires maintenance, so it is more difficult to implement compared with the first scheme.

There are generally multiple downlink and uplink switching points in a radio frame. In which downlink and uplink switching period the reference signal is sent is determined by the Operation Administration and Maintenance (OAM) configuration. The configuration principle is that the length of the uplink detection window must meet the maximum distance required for propagation of the remote interference. A specific embodiment may be as follows.

For the 5G NR, if there is a "DDSUU" switching period, where "D" represents a downlink time slot, "U" represents an uplink time slot, "S" represents a downlink and uplink switching time slot, in the configured frame structure, then it is appropriate to select the "S" time slot in this period to send the reference signal, because the length of the detection window is "2*14+x" OFDM symbols, where "x" represents the sum of the number of uplink symbols and the number of "GP" symbols in the "S" time slot. For the subcarrier spacing of 30 kHz, assuming that the format of "S" time slot is 6:6:2, then the maximum distance of the remote interference source that can be detected is 386 km, which can basically meet the maximum distance required for propagation of the remote interference. The position of the reference signal on the radio frame is as shown in FIG. 1.

The "RS" in FIG. 1 represents a reference signal symbol, and both the "RS" and "GP" are "F" symbols specified in the slot format in the 5G NR protocol, so that the terminal does not need to know the RS symbols, ensuring the compatibility of the terminal after adding the RS symbols.

Figure 2:
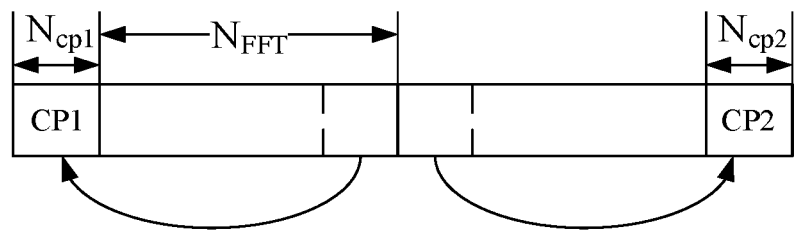
FIG. 2 is a schematic diagram of the time-domain format of a reference signal provided by an embodiment of the present application.

The time-domain format of the reference signal is as shown in FIG. 2, where the reference signal occupies two consecutive OFDM symbols, and a Common Prefix (CP) is added respectively at the front of the first symbol and at the back of the second symbol.

Since the atmospheric waveguide propagation delay is random, the symbols in the detection window of the receiving end are generally not aligned with the symbols of the received reference signal in the time domain. The time-domain format of such reference signal can ensure that the receiving end can detect the complete reference signal symbols no matter how the propagation delay changes, ensuring the detection performance.

The period of the base station to send the reference signal is determined by the OAM configuration, and the preferable configuration is that the period of the base station to send the reference signal is the system frame period, that is, the base station only sends the reference signal once in the system frame period.

Which reference signal sequence the base station sends on a specific radio frame is determined by the OAM configuration strategy. If the scale of the remote interference is small (the scale of the remote interference is mainly determined according to the area size of a cloud of cells affected by the remote interference), all base stations can be configured to send a fixed reference signal sequence, so that the base stations do not need to blindly detect multiple reference signal sequences, which can greatly reduce the complexity of the detection algorithm. If the scale of the remote interference is large, since the maximum value of the base station ID is generally much greater than the system frame period value, the probability of superposition of the same reference signal on the same symbol at the receiving end is relatively high, which will cause the higher false detection rate or missed detection rate. In this case, the OAM configures multiple reference signal sequences for all base stations to use. All reference signal sequences available to the system constitute a full set of reference signal sequences, these reference signal sequences must have the good auto-correlation and cross-correlation, and the reference signal sequences configured by the OAM may be a subset of the full set of reference signal sequences or may be the full set. Which reference signal sequence each base station uses is determined by the base station ID. The specific method is that the OAM assigns a uniquely identified sequence ID to each reference signal sequence, and the ID of a reference signal sequence is obtained by the mapping of a fixed bit segment of the base station ID when the base station selects the reference signal sequence. The specific implementations can adopt one of two following schemes.

The first scheme uses the mapping table for mapping.

The mapping table between the fixed bit segment value of the base station ID and the ID value of the reference signal sequence is queried according to the decimal value of the binary fixed bit segment of the base station ID, to obtain the ID value of the reference signal sequence.

The second scheme is based on the fixed bit segment value of the base station ID.

The decimal value of the binary fixed bit segment of the base station ID is used as the ID value of the reference signal sequence. For example, if the number of radio frames in the transmission period of dedicated reference signals is $N_{SFN}{}^{max}$ and the number of reference signal sequences is $N_{RS}$, the binary value of the sequence ID of the reference signal sent by the base station is taken as the bit segment position range of the bits of the base station ID from low to high, i.e., $[\lceil\log_2{}^{N_{SFN}{}^{max}}\rceil+1,\lceil\log_2{}^{N_{SFN}{}^{max}}\rceil+\lceil\log_2{}^{N_{RS}}\rceil]$, where the binary value of the reference signal sequence ID is converted into a decimal value as the ID value of the reference signal sequence.

If the reference signal sequences configured by the OAM are a full set of reference signal sequences, the mapping scheme between the reference signal sequence ID and the fixed bit segment of the base station ID can adopt either of the two schemes described above. If the reference signal sequences configured by the OAM are a subset of the full set of reference signal sequences, the first scheme must be adopted. The first scheme must provide a mapping table between the reference signal sequence ID and the fixed bit segment of the base station ID for each subset of or the full set of reference signal sequences that can be configured. Therefore, the first scheme is more versatile and flexible than the second scheme.

Different base stations can send different reference signal sequences, so the above schemes can further reduce the probability of non-aligned superposition of the same reference signal sequence on the same symbol at the receiving end, improving the detection performance.

2. The Frequency Domain Format of the Reference Signal Sequence.

For the 5G, the frequency and bandwidth ranges available to base stations are generally large, and the near-end base station and far-end base station may use different frequency ranges and bandwidths. In order to support the mutual detections of reference signals between base stations that have different frequency points but overlapping frequencies, an embodiment of the present application designs a frequency domain format of the reference signal sequence in the dedicated reference signal sequence sent by the base station, which is specifically as follows.

The base station divides the available maximum frequency bandwidth into several consecutive sub-frequency bands according to the specified sub-band size, and each sub-frequency band is called a frequency sub-band.

The frequency sub-band size is uniformly configured and specified by the OAM, and the minimum continuous bandwidth size actually used in the existing network needs to be considered. The frequency sub-band size of each frequency band may be different. For the same frequency band, the frequency range of each frequency sub-band divided by each base station does not require alignment, but the frequency sub-band size must be the same.

In the frequency domain, the frequency resources are allocated to reference signal symbols at the granularity of frequency sub-band. A reference signal symbol fixedly uses the subcarrier resources of one frequency sub-band in the frequency domain, and the reference signal sequence sent on each frequency sub-band must be exactly the same. If the bandwidth size of a frequency sub-band divided by the base station is smaller than the frequency sub-band size, it is not taken as a frequency sub-band, and no reference signal is sent on the frequency resource.

Figure 3:
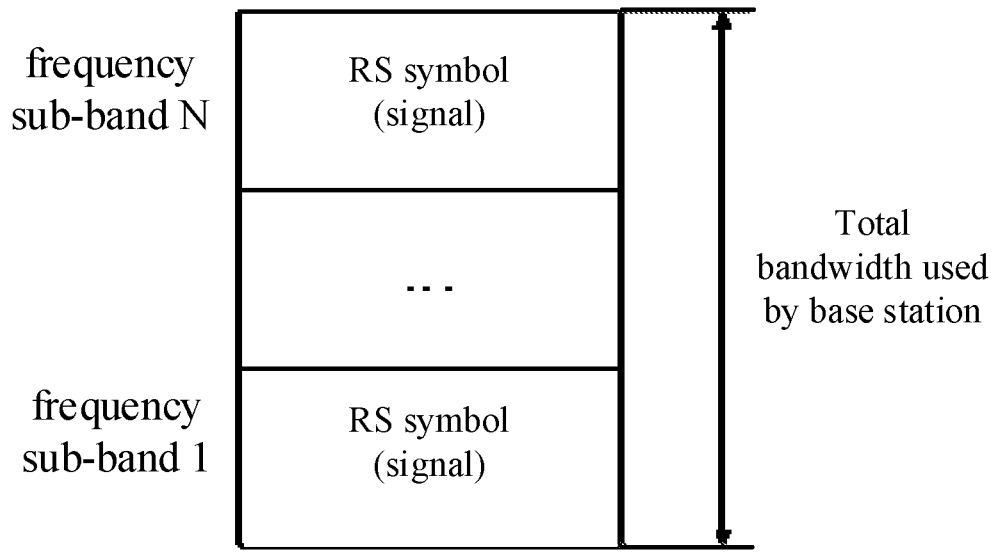
FIG. 3 is a schematic diagram of the frequency-domain format of a reference signal sequence provided by an embodiment of the present application.

A specific frequency domain format of the reference signal sequence is as shown in FIG. 3. For example, for the 5G, if the OAM configures the frequency sub-band size of a frequency band as 20 MHz and the base station can use the bandwidth of 100 MHz, the base station can divide it into 5 frequency sub-bands.

If the frequency ranges and bandwidths of two base stations are different, the frequency ranges of each frequency sub-band divided by the two base stations may not be aligned. However, since the base station at the sending end sends the same reference signal on each frequency sub-band, the frequency domain data of one frequency sub-band extracted in the detection window at the receiving end is still the frequency domain data of one complete reference signal, and therefore the reference signal can be detected normally.

If the frequency points of the near-end base station and the far-end base station are staggered but the frequencies overlap partially, and the base station needs to blindly detect the reference signal on each frequency sub-band within the full bandwidth range of the base station when detecting the reference signal, then the reference signals can be detected each other even if the frequencies of the base stations at both ends does not completely overlap when the frequency domain format of the reference signal sequence designed in the embodiment of the present application is adopted, supporting the remote interference detection between base stations with different frequency points and different bandwidths.

3. The Detection of Far-End Interference.

The base station blindly detects the reference signal sequences on all uplink symbols within the detection window in the time domain; blindly detects the reference signal sequences on all frequency sub-bands within the full bandwidth range in the frequency domain; and needs to traverse and blindly detect all reference signal sequences in the code domain if the OAM configures multiple reference signal sequences.

The base station detects the remote interference based on the remote interference characteristics and reference signals, and the specific implementations are as follows.

If the base station detects the suspected remote interference based on the remote interference characteristics within the set time T1 (that is, a dedicated reference signal is determined to be needed to be sent based on the remote interference characteristics), or continuously detects the reference signal sequence of the far-end base station, then it transmits the reference signal sequence.

If the base station continuously detects the reference signal sequence within the set time T2, then it determines that the remote interference is detected.

If the base station continuously detects no reference signal sequence and no suspected remote interference within the set time T3, then it determines that the remote interference has disappeared and stops sending the reference signal sequence.

Figure 4:
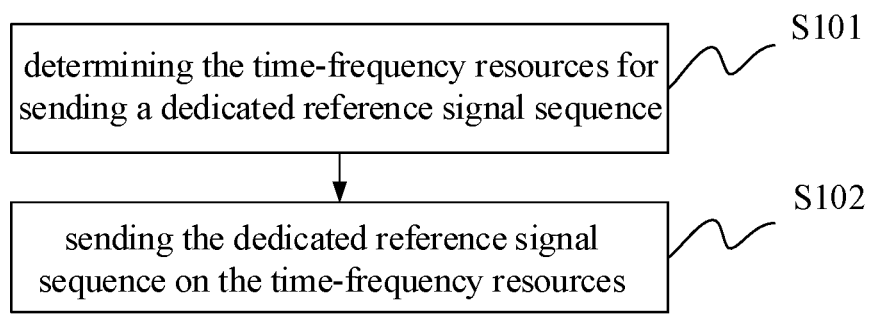
FIG. 4 is a schematic flowchart of a method for transmitting a signal provided by an embodiment of the present application.

In summary, at the sending end, an embodiment of the present application provides a method for transmitting a signal, referring to FIG. 4, including:

S101: determining time-frequency resources for sending a dedicated reference signal sequence;

S102: sending the dedicated reference signal sequence on the time-frequency resources, where the time-frequency resources include:

a special time slot of a downlink radio frame in the time domain and a frequency sub-band obtained by dividing the maximum frequency bandwidth available to a base station in the frequency domain.

The remote interference is identified by detecting the dedicated reference signal sequence, e.g. specific implementations related to the sending of the signal sequence.

Figure 5:
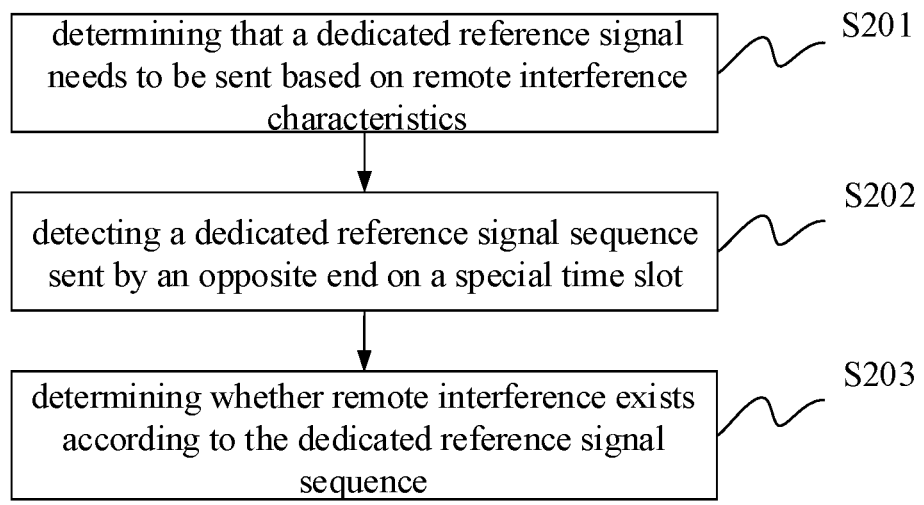
FIG. 5 is a schematic flowchart of a method for detecting a signal provided by an embodiment of the present application.

An embodiment of the present application provides a method for detecting a signal at the receiving end, referring to FIG. 5, including:

S201: determining that a dedicated reference signal needs to be sent based on remote interference characteristics;

S202: detecting a dedicated reference signal sequence sent by an opposite end on a special time slot; and S203: determining whether remote interference exists according to the dedicated reference signal sequence. Specific implementations refer to the detection of the remote interference in the embodiments of the present application.

Figure 6:
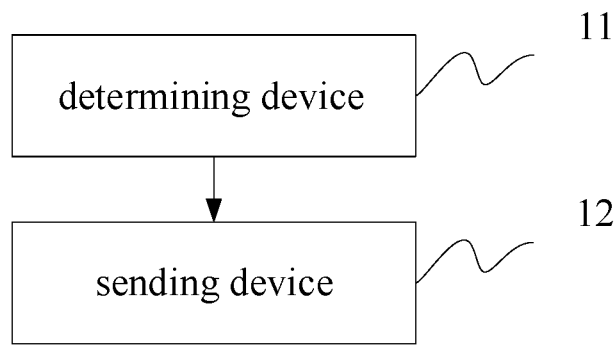
FIG. 6 is a structural schematic diagram of a device for transmitting a signal provided by an embodiment of the present application.

On the sending end entity side, an embodiment of the present application provides a method for transmitting a signal, referring to FIG. 6, including:

a determining device 11 configured to determine the time-frequency resources for sending a dedicated reference signal sequence;

a sending device 12 configured to send the dedicated reference signal sequence on the time-frequency resources, where the time-frequency resources include a special time slot of a downlink radio frame in the time domain and a frequency sub-band obtained by dividing the maximum frequency bandwidth available to a base station in the frequency domain; and identify the remote interference by detecting the dedicated reference signal sequence.

Figure 7:
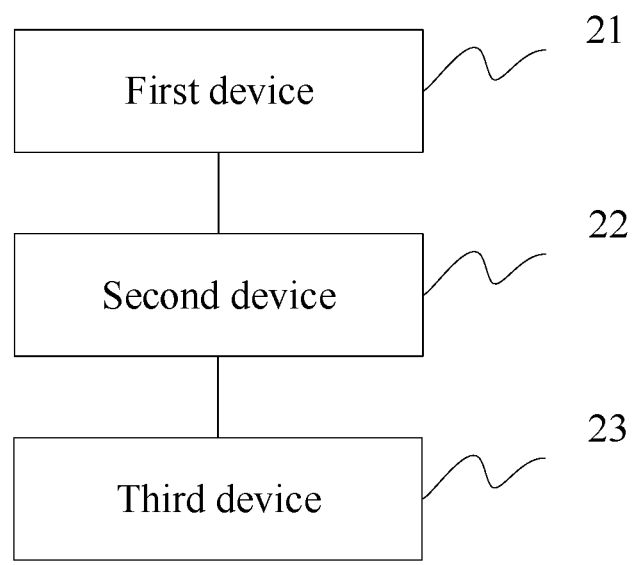
FIG. 7 is a structural schematic diagram of a device for detecting a signal provided by an embodiment of the present application.

Correspondingly, on the receiving end entity side, an embodiment of the present application provides a device for detecting a signal, referring to FIG. 7, including:

a first device 21 configured to determine that a dedicated reference signal needs to be sent based on remote interference characteristics;

a second device 22 configured to detect a dedicated reference signal sequence sent by an opposite end on a special time slot; and a third device 23 configured to determine whether remote interference exists according to the dedicated reference signal sequence.

It should be noted that the division of devices in the embodiments of the present application is illustrative, and is merely a kind of logical function division, and there may be other division methods in actual implementations. In addition, the functional devices in each embodiment of the present application may be integrated into one processing device, or each device may exist alone physically, or two or more devices may be integrated into one device. The above-mentioned integrated devices can be implemented in the form of hardware, or can be implemented in the form of software functional devices.

When the integrated device is implemented in the form of software functional device and sold or used as an independent product, it may be stored in a computer readable storage medium. Based on such understanding, the embodiments of the present application essentially or a part that contributes to the prior art or all or a part of the solution may be embodied in the form of software product. The computer software product is stored in a storage medium, and includes several instructions used to enable a computer device (which may be a personal computer, server, or network device, etc.) or a processor to perform all or some of the steps of the methods of various embodiments of the present application. The above-mentioned storage medium includes: USB flash drive, mobile hard disk, Read-Only Memory (ROM), Random Access Memory (RAM), magnetic disk or compact disc or various media that can store the program codes.

An embodiment of the present application provides a computing device, which can specifically be a desktop computer, a portable computer, a smart phone, a tablet computer, a Personal Digital Assistant (PDA) or the like. The computing device can include a Center Processing Device (CPU), a memory, input/output devices and the like. The input device can include a keyboard, a mouse, a touch screen and the like, and the output device can include a display device such as Liquid Crystal Display (LCD), Cathode Ray Tube (CRT) or the like.

The memory can include a Read-Only Memory (ROM) and a Random Access Memory (RAM), and provide the program instructions and data stored in the memory to the processor. In an embodiment of the present application, the memory may be used to store the program of any one of the methods provided by the embodiments of the present application.

The processor invokes the program instructions stored in the memory and is configured to perform any one of the methods provided by the embodiments of the present application in accordance with the obtained program instructions.

Figure 8:
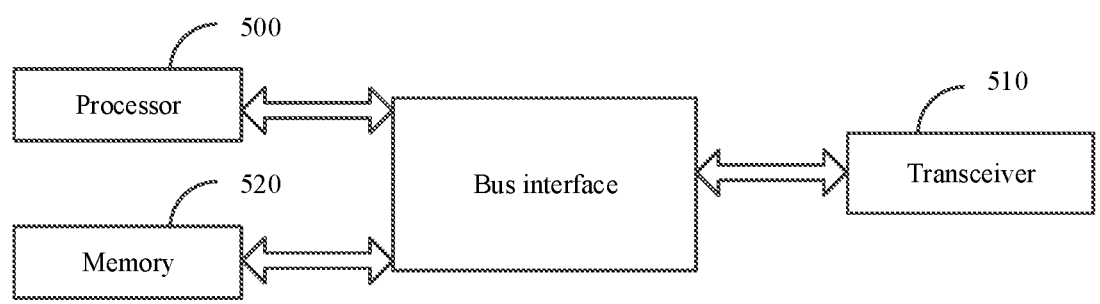
FIG. 8 is a structural schematic diagram of another device for transmitting and detecting a signal provided by an embodiment of the present application.

An embodiment of the present application provides a device for transmitting a signal, referring to FIG. 8, including:

a processor 500 configured to read the programs in a memory 520 to perform the process of:

determining time-frequency resources for sending a dedicated reference signal sequence;

sending the dedicated reference signal sequence on the time-frequency resources via a transceiver 510, where the time-frequency resources include a special time slot of a downlink radio frame in a time domain and a frequency sub-band obtained by dividing a maximum frequency bandwidth available to a base station in the frequency domain; and identifying remote interference by detecting the dedicated reference signal sequence.

In one embodiment, the processor 500 sends, via the transceiver 510, the dedicated reference signal sequence in the special time slot of the downlink radio frame determined based on the base station ID.

In one embodiment, the processor 500 determines the downlink radio frame by at least one of following two schemes:

Scheme I: querying a mapping table between the base station ID and a system frame number of the downlink radio frame where the dedicated reference signal sequence is located, and determining the system frame number of the downlink radio frame according to the base station ID:

$$n_{SFN} = \text{map\_table}(n_{NBID});$$

Scheme II: calculating and determining a system frame number of the downlink radio frame according to a formula of:

$$n_{SFN} = n_{NBID} \bmod (N_{SFN}^{max}+1);$$

where $n_{SFN}$ represents the system frame number of the downlink radio frame, $n_{NBID}$ represents the base station ID, $N_{SFN}^{max}$ represents the maximum value of the system frame number, and map_table represents the mapping table between the base station ID and the system frame number of the downlink radio frame where the dedicated reference signal sequence is located.

In one embodiment, the dedicated reference signal sequence is sent during a downlink and uplink switching period, configured by an OAM, in the downlink radio frame, and the time interval of dedicated reference signal sequences sent twice adjacently must meet the maximum propagation distance requirement of the remote interference.

In one embodiment, the dedicated reference signal sequence is located, after a downlink symbol and before a Guard Period (GP), of the special time slot.

In one embodiment, the dedicated reference signal sequence occupies two consecutive OFDM symbols in the time domain, and dedicated reference signal sequences on the two OFDM symbols are the same, where a CP is respectively provided at the front of the first OFDM symbol and at the back of the second OFDM symbol.

In one embodiment, the downlink and uplink switching period during which the base station sends the dedicated reference signal sequence is configured by an OAM, and the downlink and uplink switching period is configured to be the same as a system frame period.

In one embodiment, the dedicated reference signal sequence sent by a base station must be one of all dedicated reference signal sequences configured by an OAM, and all the dedicated reference signal sequences configured by the OAM are reference signal sequences available to all base stations within a network range managed by the OAM.

In one embodiment, the OAM configures one or more dedicated reference signal sequences, and a base station selects, based on a base station ID, a dedicated reference signal sequence from all the dedicated reference signal sequences configured by the OAM as the reference signal sequence sent by the base station.

In one embodiment, when the one or more reference signal sequences configured by the OAM are a full set of reference signal sequences, a decimal value of a fixed bit segment of the base station ID is determined as an ID of the sent dedicated reference signal sequence, or the ID of the sent dedicated reference signal sequence is determined according to a mapping table between the decimal value of the fixed bit segment of the base station ID and the ID of the dedicated reference signal sequence; when the one or more reference signal sequences configured by the OAM are a subset of the full set of reference signal sequences, the ID of the sent dedicated reference signal sequence is determined according to the mapping table between the decimal value of the fixed bit segment of the base station ID and the ID of the dedicated reference signal sequence.

In one embodiment, the fixed bit segment of the base station ID is determined based on a preset rule according to the number of the one or more dedicated reference signal sequences configured by the OAM and the number of radio frames during a downlink and uplink switching period of the one or more dedicated reference signal sequences.

In one embodiment, the location range of the fixed bit segment of the base station ID can be determined by the formula of:

$$[\lceil \log_2 N_{SFN}^{max} \rceil + 1, \lceil \log_2 N_{SFN}^{max} \rceil + \lceil \log_2 N_{RS} \rceil]$$

where $N_{SFN}^{max}$ represents the number of radio frames in the transmission period of dedicated reference signals configured by the OAM, and $N_{RS}$ represents the number of dedicated reference signal sequences included in the range configured by the OAM.

In one embodiment, the frequency sub-band is obtained by continuously dividing the maximum frequency bandwidth available to the base station according to a frequency sub-band size uniformly configured by an OAM, one dedicated reference signal sequence is sent on one frequency sub-band resource in the frequency domain, and dedicated reference signal sequences sent, by a same base station, on different frequency sub-bands are the same.

In one embodiment, sizes of respective frequency sub-bands in a same frequency band are identical, and sizes of respective frequency sub-bands in different frequency bands are not limited in size. When the bandwidth size of a frequency band divided by the base station is smaller than the sizes of respective frequency sub-bands, the frequency band is not used as a frequency sub-band, and no dedicated reference signal sequence is sent on the frequency band.

At the receiving end, the processor 500 may perform the process of:

determining that a dedicated reference signal needs to be sent based on remote interference characteristics;

detecting a dedicated reference signal sequence sent by an opposite end on a special time slot; and determining whether remote interference exists according to the dedicated reference signal sequence.

In one embodiment, when the processor 500 determines that a dedicated reference signal needs to be sent based on the remote interference characteristics within first preset time, or when the number of times the dedicated reference signal sequence is detected is greater than N1 within the first preset time, then the dedicated reference signal sequence is sent;

when the number of times the dedicated reference signal sequence is detected within the second preset time is greater than N2 (N2>N1), then it is determined that the remote interference exists;

when the number of times the dedicated reference signal sequence is detected within the third preset time is less than N3 (N3<N2), then it is determined that no remote interference exists.

The transceiver 510 is configured to receive and send the data under the control of the processor 500.

Here, in FIG. 8, the bus architecture may include any numbers of interconnected buses and bridges, and specifically link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 may be elements, i.e., include a transmitter and a receiver, and provide the devices for communicating with various other devices over the transmission media. The processor 500 is responsible for managing the bus architecture and general processing, and the memory 520 may store the data used by the processor 500 when performing the operations.

The processor 500 may be Central Processing Device (CPU), Application Specific Integrated Circuit (ASIC), Field-Programmable Gate Array (FPGA) or Complex Programmable Logic Device (CPLD).

An embodiment of the present application provides a computer storage medium for storing the computer program instructions used by the device provided by the embodiments of the present application described above, where the computer storage medium contains the program for performing any one of the methods provided by the embodiments of the present application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by the embodiments of the present application may be applied to the terminal devices, and may also be applied to the network devices.

Here, the terminal device can also be referred to as the User Equipment ("UE" for short), Mobile Station ("MS" for short), Mobile Terminal ("MT" for short) or the like. In one embodiment, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, and the rest of the access network may include Internet Protocol (IP) networks. The base station may further coordinate the attribute management of the air interface. For example, the base station can be the BTS in the GSM or CDMA, or can be the NodeB in the WCDMA, or can be the NodeB or eNB or e-NodeB (evolutional Node B) in the LTE, or can be the gNB in the 5G system, or the like, which is not limited in the embodiments of the present application.

The processing flows of the above methods may be implemented by a software program, which may be stored in a storage medium. When the stored software program is invoked, the above method steps are performed.

The detection period of the existing technical solution is too long, and the real-time detection is poor, which affects the effectiveness of interference avoidance. The present application only requires the detection of remote interference without detecting and identifying all remote interference sources, so the transmission period and detection period of the reference signal are the system frame period, and the detection is relatively real-time, so that the interference avoidance is real-time.

The detection algorithm of the existing solution has too high complexity, and consumes a lot of resources of the base station equipment. The embodiments of the present application is that the base station only needs to detect the reference signal sequence in one downlink and uplink switching period in the radio frame according to the OAM configuration and does not need to traverse all downlink and uplink switching periods, and the reference signal sequence that needs to be detected is configurable. To reduce the complexity of the detection algorithm, fewer or even one reference signal sequence may be configured, which will not significantly affect the detection result but can greatly reduce the complexity of the detection algorithm.

The existing solution does not support the remote interference detection and interference avoidance between base stations with different central frequency points and different bandwidths, which greatly limits its application scenarios. The present application proposes the concept and solution of frequency sub-bands, and the base station detects the remote interference in the frequency domain with the granularity of frequency sub-band, to support the remote interference detection between base stations with different frequency points and different bandwidths.

Embodiments of the disclosure can provide methods, systems and computer program products. Thus the disclosure can take the form of hardware embodiments alone, software embodiments alone, or embodiments combining the software and hardware aspects. Also the disclosure can take the form of computer program products implemented on one or more computer usable storage mediums (including but not limited to magnetic disk memories, CD-ROMs, optical memories and the like) containing computer usable program codes therein.

The disclosure is described by reference to the flow charts and/or the block diagrams of the methods, the devices (systems) and the computer program products according to the embodiments of the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is to guide the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A method for transmitting a signal, comprising:
   determining time-frequency resources for sending a dedicated reference signal sequence, wherein the time-frequency resources comprise:
   a time slot of a downlink radio frame in a time domain and a frequency sub-band obtained by dividing a maximum frequency bandwidth available to a base station in a frequency domain;
   sending the dedicated reference signal sequence on the time-frequency resources; and
   identifying remote interference by detecting the dedicated reference signal sequence;
   wherein the dedicated reference signal sequence is sent in the time slot of the downlink radio frame determined based on a base station ID, and the downlink radio frame is determined by at least one of following two schemes:
   Scheme I: querying a mapping table between the base station ID and a system frame number of the downlink radio frame where the dedicated reference signal sequence is located, and determining the system frame number of the downlink radio frame according to the base station ID:

$$n_{SFN} = \text{map\_table}(n_{NBID});$$

Scheme II: calculating and determining a system frame number of the downlink radio frame according to a formula of:

$$n_{SFN} = n_{NBID} \bmod (N_{SFN}^{max} + 1);$$

wherein $n_{SFN}$ represents the system frame number of the downlink radio frame, $n_{NBID}$ represents the base station ID, $N_{SFN}^{max}$ represents a maximum value of the system frame number, and map_table represents the mapping table between the base station ID and the system frame number of the downlink radio frame where the dedicated reference signal sequence is located.

2. The method of claim 1, wherein the dedicated reference signal sequence is sent during a downlink and uplink switching period, configured by an Operation Administration and Maintenance (OAM), in the downlink radio frame; and
   a time interval of dedicated reference signal sequences sent twice adjacently meet a maximum propagation distance requirement of the remote interference.

3. The method of claim 1, wherein the dedicated reference signal sequence is located, after a downlink symbol and before a Guard Period (GP), of the time slot;
   the dedicated reference signal sequence occupies two consecutive Orthogonal Frequency Division Multiplexing (OFDM) symbols in the time domain,
   dedicated reference signal sequences on the two OFDM symbols are identical, and
   a Common Prefix (CP) is respectively provided in front of a first OFDM symbol and in back of a second OFDM symbol.

4. The method of claim 1, wherein the dedicated reference signal sequence sent by a base station must be one of all dedicated reference signal sequences configured by an OAM, and all the dedicated reference signal sequences configured by the OAM are reference signal sequences available to all base stations within a network range managed by the OAM.

5. The method of claim 4, wherein the OAM configures one or more dedicated reference signal sequences, and the base station selects, based on a base station ID, a dedicated reference signal sequence from all the dedicated reference signal sequences configured by the OAM as the reference signal sequence sent by the base station.

6. The method of claim 5, wherein
   when the one or more reference signal sequences configured by the OAM are a full set of reference signal sequences, a decimal value of a fixed bit segment of the base station ID is determined as an ID of the dedicated reference signal sequence sent by the base station, or the ID of the dedicated reference signal sequence sent by the base station is determined according to a mapping table between the decimal value of the fixed bit segment of the base station ID and the ID of the dedicated reference signal sequence;

when the one or more reference signal sequences configured by the OAM are a subset of the full set of reference signal sequences, the ID of the dedicated reference signal sequence sent by the base station is determined according to the mapping table between the decimal value of the fixed bit segment of the base station ID and the ID of the dedicated reference signal sequence.

7. The method of claim 6, wherein the fixed bit segment of the base station ID is determined based on a preset rule according to a quantity of the one or more dedicated reference signal sequences configured by the OAM and a quantity of radio frames during a downlink and uplink switching period of the one or more dedicated reference signal sequences.

8. The method of claim 1, wherein the frequency sub-band is obtained by continuously dividing the maximum frequency bandwidth available to the base station according to a frequency sub-band size uniformly configured by an OAM,
one dedicated reference signal sequence is sent on one frequency sub-band resource in the frequency domain, and
dedicated reference signal sequences sent, by a same base station, on different frequency sub-bands are identical.

9. The method of claim 8, wherein sizes of respective frequency sub-bands in a same frequency band are identical, and sizes of respective frequency sub-bands in different frequency bands are identical or different; and
when a bandwidth size of a frequency band divided by the base station is smaller than the sizes of respective frequency sub-bands, the frequency band is not used as a frequency sub-band, and no dedicated reference signal sequence is sent on the frequency band.

10. A device for transmitting a signal, comprising:
a memory configured to store program instructions;
a processor configured to invoke the program instructions stored in the memory to perform following operations:
determining time-frequency resources for sending a dedicated reference signal sequence, wherein the time-frequency resources comprise:
a time slot of a downlink radio frame in a time domain and a frequency sub-band obtained by dividing a maximum frequency bandwidth available to a base station in a frequency domain;
sending the dedicated reference signal sequence on the time-frequency resources; and
identifying remote interference by detecting the dedicated reference signal sequence;
wherein the processor is specifically configured to:
send the dedicated reference signal sequence in the time slot of the downlink radio frame determined based on a base station ID; and
determine the downlink radio frame by at least one of following two schemes:
Scheme I: querying a mapping table between the base station ID and a system frame number of the downlink radio frame where the dedicated reference signal sequence is located, and determining the system frame number of the downlink radio frame according to the base station ID:

$$n_{SFN} = \text{map\_table}(n_{NBID});$$

Scheme II: calculating and determining a system frame number of the downlink radio frame according to a formula of:

$$n_{SFN} = n_{NBID} \bmod (N_{SFN}^{max} + 1);$$

wherein $n_{SFN}$ represents the system frame number of the downlink radio frame, $n_{NBID}$ represents the base station ID, $N_{SFN}^{max}$ represents a maximum value of the system frame number, and map_table represents the mapping table between the base station ID and the system frame number of the downlink radio frame where the dedicated reference signal sequence is located.

11. The device for transmitting the signal of claim 10, wherein the dedicated reference signal sequence is sent during a downlink and uplink switching period, configured by an Operation Administration and Maintenance function (OAM), in the downlink radio frame, and
a time interval of dedicated reference signal sequences sent twice adjacently meet a maximum propagation distance requirement of the remote interference.

12. The device for transmitting the signal of claim 10, wherein the dedicated reference signal sequence is located, after a downlink symbol and before a Guard Period (GP), of the time slot;
the dedicated reference signal sequence occupies two consecutive Orthogonal Frequency Division Multiplexing (OFDM) symbols in the time domain,
dedicated reference signal sequences on the two OFDM symbols are identical, and
a Common Prefix (CP) is respectively provided in front of a first OFDM symbol and in back of a second OFDM symbol.

13. The device for transmitting the signal of claim 10, wherein the dedicated reference signal sequence sent by the processor must be one of all dedicated reference signal sequences configured by an OAM, and all the dedicated reference signal sequences configured by the OAM are reference signal sequences available to all base stations within a network range managed by the OAM.

14. The device for transmitting the signal of claim 13, wherein the OAM configures one or more dedicated reference signal sequences, and the processor selects, based on a base station ID, a dedicated reference signal sequence from all the dedicated reference signal sequences configured by the OAM as the reference signal sequence sent by the processor.

15. The device for transmitting the signal of claim 14, wherein
when the one or more reference signal sequences configured by the OAM are a full set of reference signal sequences, the processor determines a decimal value of a fixed bit segment of the base station ID as an ID of the dedicated reference signal sequence sent by the processor, or determines the ID of the dedicated reference signal sequence sent by the processor according to a mapping table between the decimal value of the fixed bit segment of the base station ID and the ID of the dedicated reference signal sequence;
when the one or more reference signal sequences configured by the OAM are a subset of the full set of reference signal sequences, the ID of the dedicated reference signal sequence sent by the processor is determined according to the mapping table between the decimal value of the fixed bit segment of the base station ID and the ID of the dedicated reference signal sequence.

16. The device for transmitting the signal of claim 15, wherein the processor determines the fixed bit segment of the base station ID based on a preset rule according to a quantity of the one or more dedicated reference signal sequences configured by the OAM and a quantity of radio frames during a downlink and uplink switching period of the one or more dedicated reference signal sequences.

17. The device for transmitting the signal of claim 10, wherein the frequency sub-band is obtained by continuously dividing the maximum frequency bandwidth available to the processor according to a frequency sub-band size uniformly configured by an OAM,
- one dedicated reference signal sequence is sent on one frequency sub-band resource in the frequency domain, and
- dedicated reference signal sequences sent, by a same base station, on different frequency sub-bands are identical.

18. The device for transmitting the signal of claim 17, wherein sizes of respective frequency sub-bands in a same frequency band are identical, and sizes of respective frequency sub-bands in different frequency bands are identical or different; and
- when a bandwidth size of a frequency band divided by the processor is smaller than the sizes of respective frequency sub-bands, the frequency band is not used as a frequency sub-band, and no dedicated reference signal sequence is sent on the frequency band.

* * * * *